(12) United States Patent
Sun

(10) Patent No.: US 6,598,712 B1
(45) Date of Patent: Jul. 29, 2003

(54) BRAKING DEVICE FOR BABY CARRIAGE

(75) Inventor: Chien-Wei Sun, Hsin-Chu (TW)

(73) Assignee: Kingstar Baby Carriage Co., Ltd. (TW)

( * ) Notice: Subject to any disclaimer, the term of this patent is extended or adjusted under 35 U.S.C. 154(b) by 0 days.

(21) Appl. No.: 10/151,827

(22) Filed: May 22, 2002

(51) Int. Cl.$^7$ ............................................. B62B 5/04
(52) U.S. Cl. ........................ 188/20; 188/31; 267/5
(58) Field of Search ............... 188/19, 20, 31; 267/5

(56) References Cited

U.S. PATENT DOCUMENTS 5,460,399 A * 10/1995 Baechler et al. ............ 280/650
6,022,042 A * 2/2000 Hartenstine ................. 280/642

* cited by examiner

Primary Examiner—Christopher P. Schwartz
(74) Attorney, Agent, or Firm—Lowe Hauptman Gilman & Berner, LLP

(57) ABSTRACT

The present invention relates to two braking devices employed in a baby carriage. The braking device includes a braking base, a braking wheel, a pad, a pad surface, a stop node and a linkage set. The linkage set connects to two braking devices. When the user step down the pad, the braking devices will be activated to a releasing mode. The baby carriage is therefore able to move. If the user steps down the linkage set, the baby carriage will enter into a braking mode. Thus the baby carriage will be secured and stopped.

3 Claims, 6 Drawing Sheets

BRAKING DEVICE FOR BABY CARRIAGE

BACKGROUND OF THE INVENTION

1. Field of the Invention

The present invention generally relates to a braking device for a baby carriage. The user may step down a mechanism to control the barking device.

2. Background Description

The baby carriage is very popular in the modem age. Particularly when parents would like to bring babies to other places, the baby carriages are suitable to take the babies along with the parents. However, the parent does not pay enough attention to the safety as to the convenience of the baby carriage. When the baby carriage is not moving, a poor design to the braking device would endanger the baby.

Prior baby carriages are shown as FIG. 1, the baby carriage 1 has a frame 10, plural wheels 12, a handler 16, a baby receiving area 18 and a braking device 14. The frame 10 is designed to support the whole baby carriage 1 and to link every element of the baby carriage 1. The handler 16 is connected to a part of the frame 10 and provides a convenient way to move the baby carriage by hands. The baby receiving area 18 provides an area for placing a pad, supported by carriage supports 180, to comfort the baby. The braking device 14 is connected to the wheels 12 in order to stop the wheels. The braking device contains a stop rod 140 shown in FIG. 2, connected to an end of the braking device 14. When the stop rod 140 is stepped down, the braking device 14 will stop the wheels 12. Thus, the wheels 12 will stop rotation and the baby carriage is at the braking mode. If the user lifts the stop rod 140 by the foot, the braking device 14 will be released and the wheel is therefore rotatable at the releasing mode.

Please refer to FIGS. 3 and 4. FIG. 3 shows a prior baby carriage at a releasing mode. FIG. 4 shows the cross section of prior known baby carriage. As shown in the Figures, the braking device 14 includes at least a braking base 141, a braking wheel 142 and a step pad 143. Wherein the braking base 141 is connected to the frame 10 of the baby carriage 1, including a pivot 1410. The axis of the braking wheel 142 is connected to the axle 120 of the wheel 12. In this case, the braking wheel 142 and the wheels may rotate at the same axle. The step pad 143 is formed as a rectangular shape. The central portion of the step pad 143 is connected to the pivot 1410 of the braking base 141 and able to be locked to the outside of the braking base 141. In this case, the step pad 143 may rotate around the pivot 1410 circularly. The step pad 143 further includes a pad face 1430, a stop node 144 and a pad securing device 145. The pad face 1430 and the stop node 144 are placed the outside portion 148. The pad face 1430 is for stepping down by the user. The stop node 144 is for controlling the wheels whether being stopped or not. The pad locking device 145 is for locking the pad 143 in a braking mode or a releasing mode. The pad locking device 145 includes a pin 1450 and an elastic element 1451. The elastic element 1451 is placed in a proper place of the pad 143. The pin 1450 is a pillar connecting to a curve surface 1411 at one end, and connecting to the elastic element 1451 at another end. The restoring force provided by the elastic element 1451 is able to enforce the pin 1450 attaching the curve surface 1411 very tightly. Since the curve surface 1411 is designed as an arched shape, when the pad 143 rotates along the center of the pivot 1410, the pad 143 will be forced to the curve surface 1411 and therefore be fixed.

When the user is not using the braking device 14, the pad 143 maintains the position shown in FIG. 3, wherein the position is the releasing position. In the case, the stop node 144 is far from the braking wheel 142. The braking wheel 142 is therefore freely rotatable. The user may move the baby carriage to other places without the limitation from the braking device. If the user would like to stop the baby carriage or keep the baby carriage at where it is, the user has to step down the pad 143, as shown in FIG. 4, at a braking position. In the case, the stop node 144 contacts the braking wheel 142. Since the braking wheel is a rachet and the stop node is a pin, as shown in FIG. 3, when the stop node 144 contacts the braking wheel 142, the braking node 144 will be inserted into the braking wheel 142 as shown in FIG. 4. In this case, the braking wheel will stop rotation, as do to the wheels in order to stop the baby carriage.

Besides, as shown in FIG. 2, a step bar 140 is extended from the pad 143. The step bar 140 is connected to the pads 143 of braking devices 14 at both ends. The user is therefore able to employ his/her toe or feet to move down the pad 143 in order to brake the baby carriage or lift up the pad 143 in order to release the braking device.

As stated above, the user has to depress the pad 143 to deploy the braking device and to lift up the pad 143 by user's shoes. In this case, shoes may be smudged by dirt on the pad. Further disadvantages of the prior known baby carriage is that the baby carriage is easy to be stopped accidently if the parent or user step down the barking pad unintentionally. In this case, no matter the baby is thrown out or the baby carriage is damaged, is not willing to be seen or happened.

SUMMARY OF THE INVENTION

It is therefore an object of the present invention to provide a linkage device; placed in a side of the stop node and the pad, for releasing the braking device particularly when the pad is stepped down.

It is another object of the present invention to provide the linkage device placed in the inner side of the pad in order to be away from the user for reducing the accidence of stepping down the pad.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
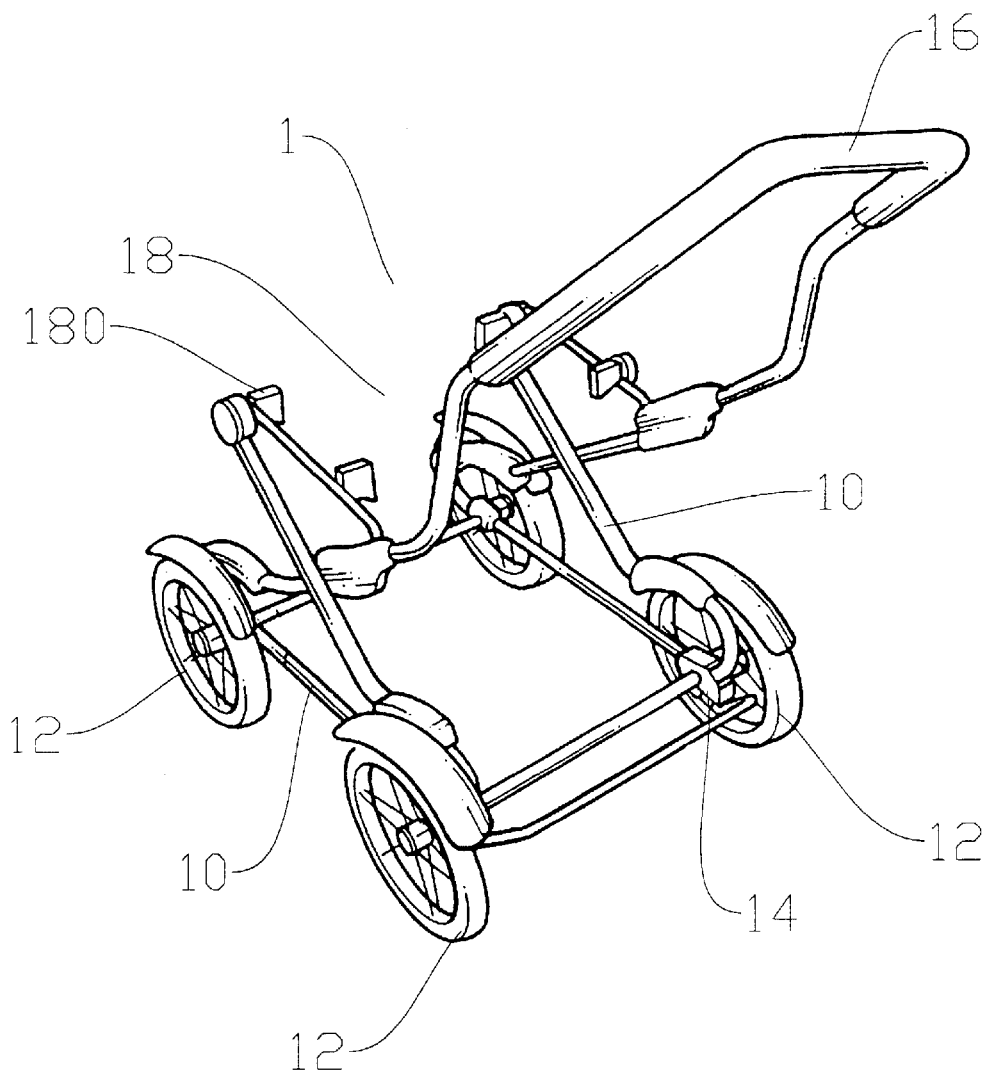
FIG. 1 shows a prior known baby carriage.
Figure 2:
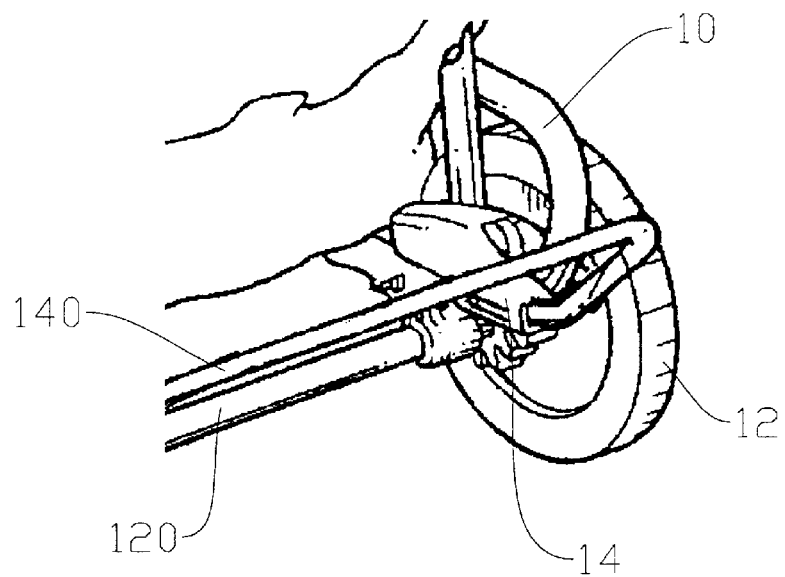
FIG. 2 is the braking device of the prior known baby carriage.
Figure 5:
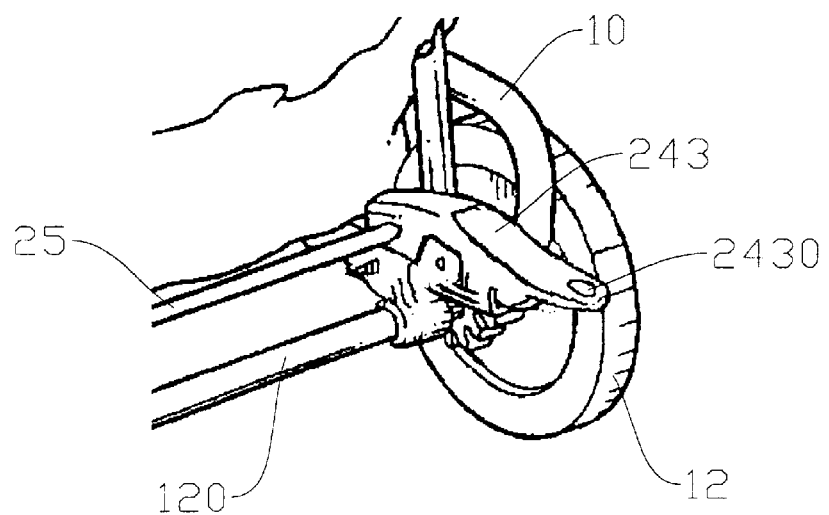
FIG. 5 shows the braking device of the present invention.
Figure 3:
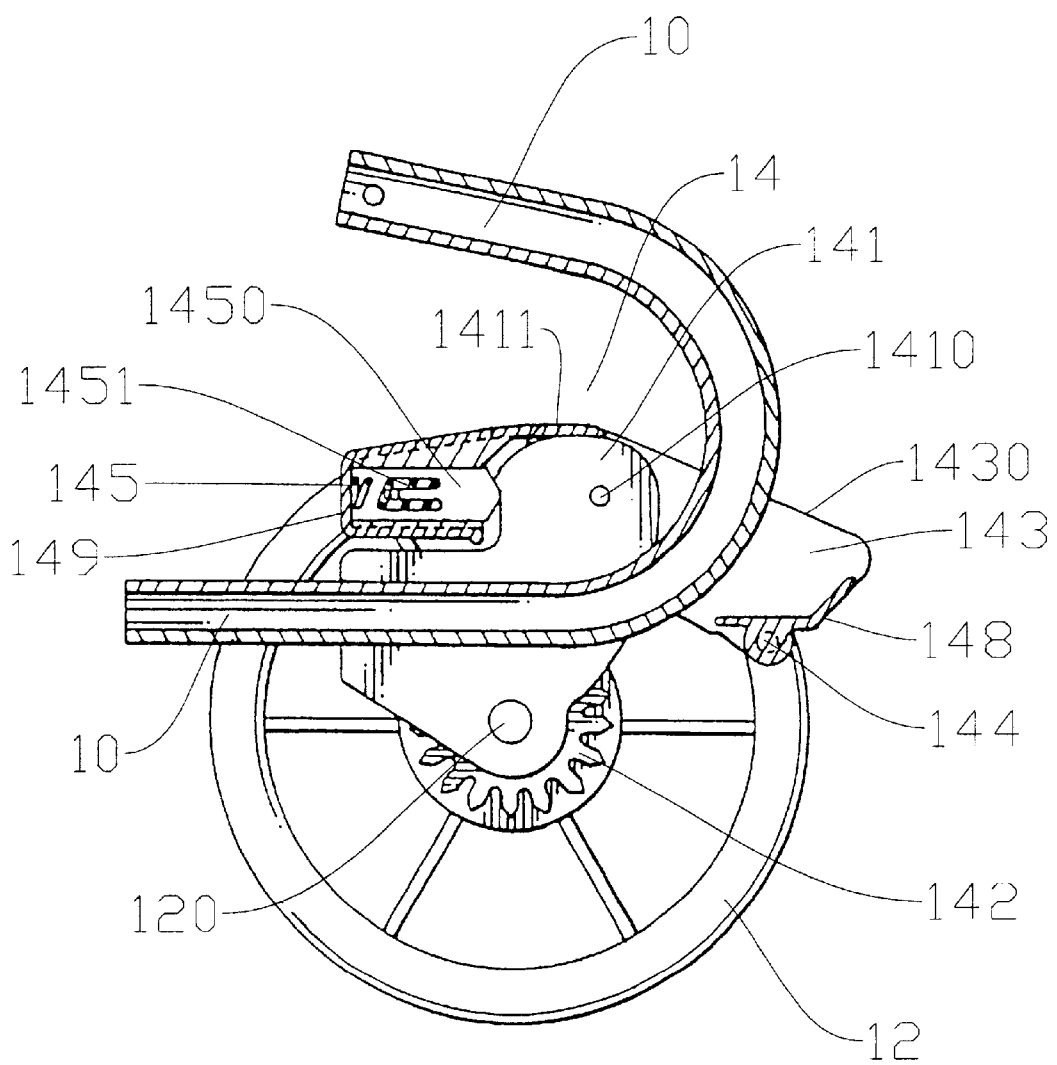
FIG. 3 shows the braking device of the prior known baby carriage at a releasing mode.
Figure 4:
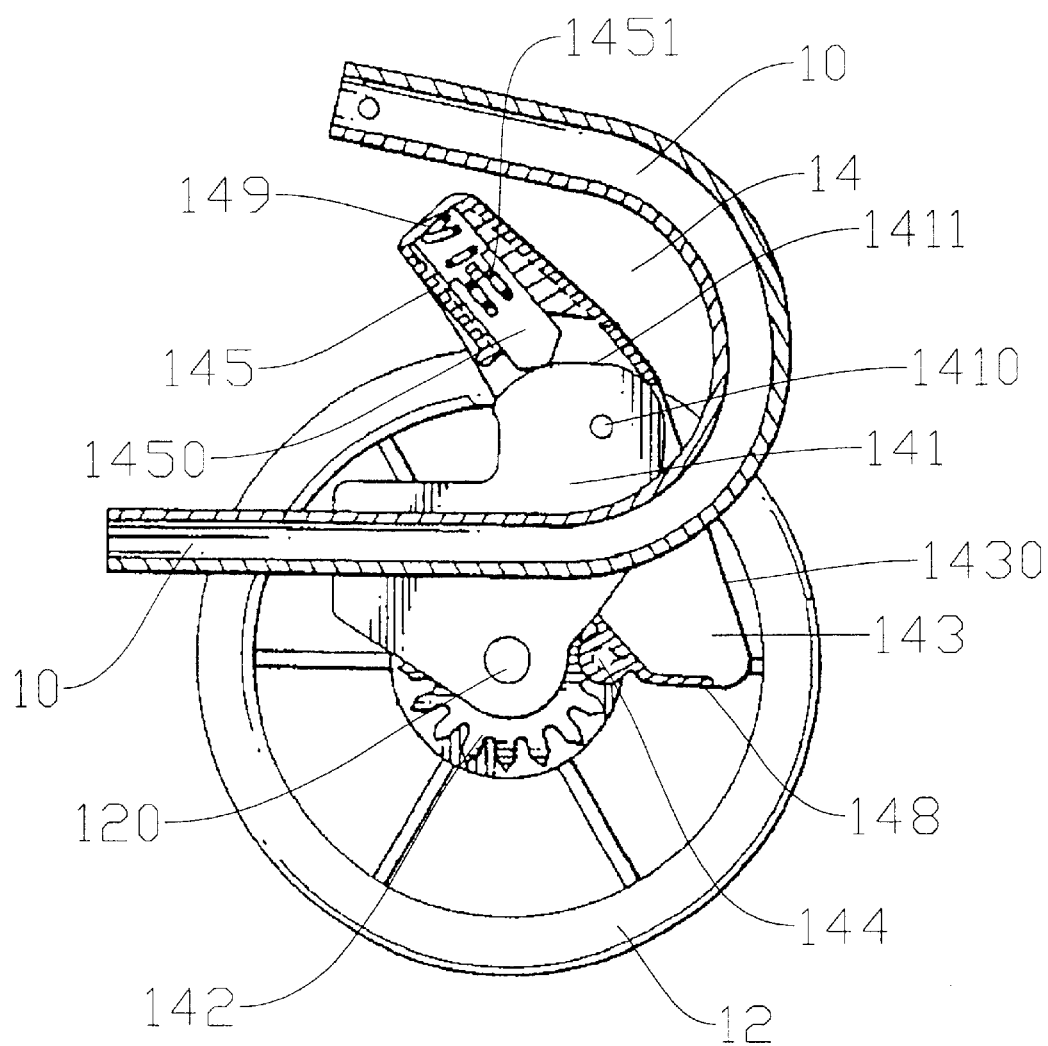
FIG. 4 is the cross section of the barking device of the prior known baby carriage.
Figure 6:
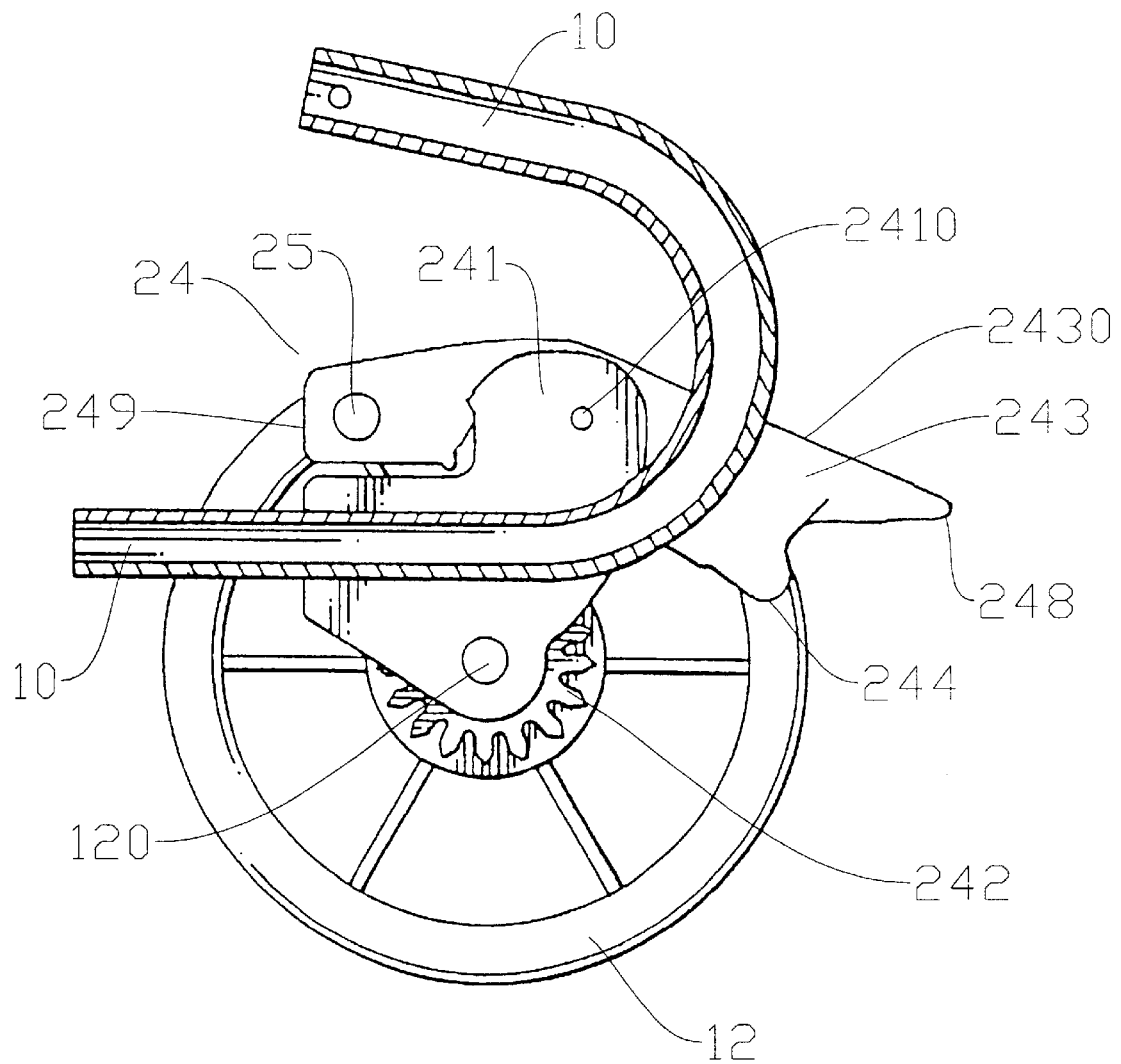
FIG. 6 shown the braking device at the releasing mode.
Figure 7:
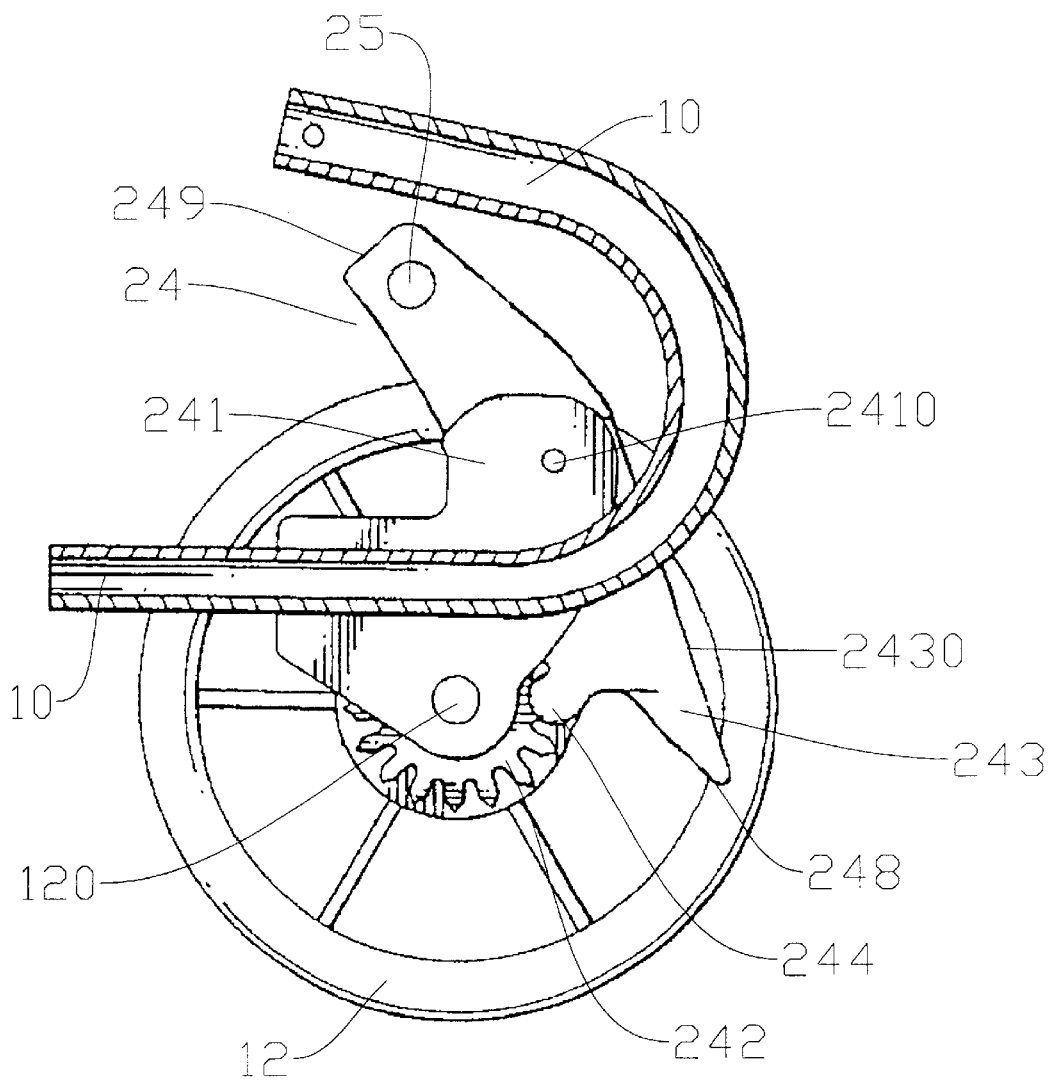
FIG. 7 shows the cross section of the present invention at the braking mode.

Please refer to FIGS. 5, 6 and 7 for the details of the braking device employed in the present invention. FIG. 5 shows the braking device of the present invention especially to achieving the single step with two braking effects. FIG. 6 shows the releasing mode and FIG. 7 shows the braking mode. As shown in the Figures, the braking device 24 includes a braking base 241, a stop node 242, a pad 243 and a linkage set 25. The braking base, the stop node 242 and the pad 243 are similar to the prior known elements of the baby carriage. However, the stop rod 140 shown in the prior known baby carriage is not seen and utilized in the present invention. When the user step on the pad surface 2430 to make the pad 243 down, the barking device 24 will be activated. The pad surface 2430 is placed the outer side 248 of the pad 243. As shown in FIG. 6, the linkage set 25 connects to another braking device (not shown in the figures) at the inner side 249, wherein the outer side 248 is near the user and the inner side 249 is near the baby receiving area 18 of the baby carriage.

Please refer to FIG. 6. The pad surface 2430 is able to be stepped by the instep or the foot of the user. The pad 243 therefore rotates around the pivot 2410. In this case, the outer side 248 of the pad 243 is lowered as shown in FIG. 7. Meanwhile, the inner side 249 is raised up and so does the linkage set 25. The stop node 244 will contact the braking wheel 242 to stop the rotation of the braking wheel 242. Since the wheels 12 and the barking wheel 242 employ the same axle 120, the wheels 12 of the baby carriage 1 will stop to achieve the brake purpose.

If the user would like to release the barking device 24 of the present invention, the user may step down the linkage set 25 in order to lower the position of the inner side 249 of the pad 243. In this case, the outer side 248 of the pad 243 will be lifted to detach the stop node 244 and the braking wheel 242 to release the braking situation.

Instead of the stop node 244 being a pin and the braking wheel being a rachet, the stop node 244 could be designed as a shape of arch (not shown in the figures), the braking wheel 242 may also be designed as an arch to match the inner surface of the stop node. When the stop node 244 contacts the braking wheel 242, the surfaces of the arches will be attached and create a friction to stop the wheels. In this case, the baby carriage will be stopped. Moreover, the position of the stop node 244 is not limited to be set on the outer side 248 of the pad 243, it would be fine to set it on the outer side 249 if the pivot 2410 is positioned below the frame 10 of the baby carriage 1. In this case, when the user steps down the pad 243, the stop node 244 will be lifted to contact the braking wheel 242 to stop the baby carriage.

In view of the above, since both ends of the linkage set are connected to two braking devices, when the user steps down the pad, the linage set will be lifted up to make the braking devices at a braking mode. For the utilization of two braking devices in the present invention, the baby carriage would be secured. Furthermore, when the user pushes the linkage set directly, the braking device will be forced into the releasing mode. It is different to the prior baby carriage that needs instep or foot to lift a mechanism in order to release the braking device, avoiding the dirts made to the shoes. Accordingly, the pad is placed the outer side, the user would not easily to cause the barking mode. The baby is therefore secured from accident occasions.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A braking device, comprising:

a braking base, connected to a frame and having a pivot;

a braking wheel, connected to a wheel and synchronized with the rotation of said wheel;

a pad, mounted on said pivot and able to rotate along said pivot, having
  a pad surface positioned at an outward side of said pad where said outward side faces a user and is depressable by said user
  and a stop node adjacent to said braking wheel in order to stop said wheel when said stop node engages said braking wheel;

a linkage set, connected to an inward side of said pad where said inward side is opposite to said outward side along said pivot, further said linkage set is depressable to release said stop node from said braking wheel.

2. The braking device of claim 1, wherein said braking wheel has a circle shape and said stop node has a shape of arch.

3. The braking device of claim 1, wherein the radian of said braking wheel is the same as the radian of said stop node.

\* \* \* \* \*